United States Patent [19]

Kotani et al.

[11] Patent Number: 4,989,237
[45] Date of Patent: Jan. 29, 1991

[54] IMAGE DATA TRANSMISSION APPARATUS

[75] Inventors: Matahira Kotani, Ikoma; Masafumi Matsumoto, Takaichi; Junichiro Matsumoto, Osaka; Motohiko Hayashi, Yamatokoriyama; Mamoru Fujii, Nara; Masafumi Yamanoue, Yao; Katsuyuki Sakai, Yamatokoriyama; Kouichi Mino, Higashikodaira; Naomitsu Murata, Nagoya; Hiroya Inagaki, Suginami; Mitsunobu Kondo, Yokohama, all of Japan

[73] Assignee: Sharp Kabushiki Kaisha, Osaka, Japan

[21] Appl. No.: 323,870

[22] Filed: Mar. 15, 1989

[30] Foreign Application Priority Data

Mar. 15, 1988 [JP] Japan ................................ 63-62664
Mar. 15, 1988 [JP] Japan ............................ 63-35086[U]
Mar. 15, 1988 [JP] Japan ............................ 63-35087[U]

[51] Int. Cl.$^5$ ................................................ H04N 1/04
[52] U.S. Cl. .................................. 379/100; 358/473; 358/494; 358/496; 358/498
[58] Field of Search ............... 379/100; 358/473, 494, 358/496, 498, 476

[56] References Cited

U.S. PATENT DOCUMENTS 4,652,937  3/1987  Shimura et al. ................. 379/100
4,716,291 12/1987  Sakamoto et al. ................ 358/473

FOREIGN PATENT DOCUMENTS 60-70867  4/1985  Japan ................................ 379/110

Primary Examiner—Jin F. Ng
Assistant Examiner—Stella L. Woo

[57] ABSTRACT

Disclosed is an image data transmission apparatus which includes an image reading unit for reading the original image, and a transmission apparatus main body. The main body includes a memory for storing the image data read by the image reading unit and transmits the content of the memory. The image reading unit is detachably mounted on the transmission apparatus main body. The transmission apparatus main body is further provided with a conveying device for conveying the original in a state in which the image reading unit is mounted on the transmission apparatus main body to thereby read the original. The image reading unit may also scan the original to read an original image, in a state in which the image reading unit is dismounted from the transmission apparatus main body. Further, a sheet element made of a material of a low coefficient of friction, as opposed to the original, may be disposed at a position corresponding to the mounted state of the image reading unit on the transmission apparataus main body. Further, an image data transmission apparatus is disclosed which possesses the telephone function and copy function, and is also provided with, as desired, a facsimile function by mounting a detachable facsimile processing device in the transmission apparatus main body. Further, the operation panel may be, in order to use it as the original stacker, disposed angularly dislocatably around the axial line crossing with the original inserting direction.

5 Claims, 6 Drawing Sheets

16

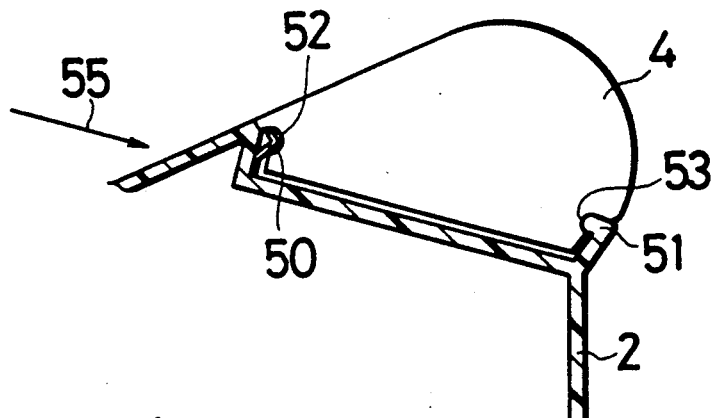
Fig. 4 (1)
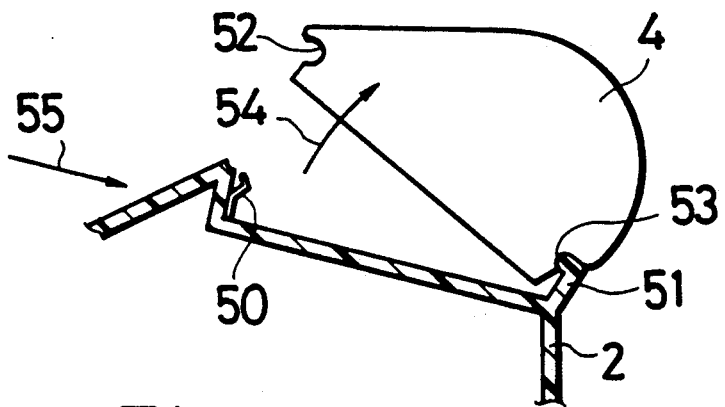
Fig. 4 (2)

IMAGE DATA TRANSMISSION APPARATUS

BACKGROUND OF THE INVENTION

1. Field of the Invention

The present invention relates to a transmission apparatus with as a telephone with facsimile function. More particularly, it relates to an image data transmission apparatus capable of transmitting image data possessing an image reading unit for reading the image optically.

2. Description of the Prior Art

In a facsimile apparatus, an original is inserted by the operator into an original inlet formed in the apparatus main body, and is read by a reading device. Thereafter the image information is transmitted to another facsimile apparatus. The original inlet is formed near the reading device and a one-dimensional contact type image sensor is disposed inside the apparatus main body. The size of the inlet corresponds to the length of the contact image sensor.

In such facsimile apparatus, it is impossible to transmit an original which is too large to be inserted in the original inlet or is too bulky, such as a book.

A typical conventional device method for solving such problem is disclosed in the Japanese Laid-open Patent No. 62-30461. In this device, the image reading unit, having a reading device is designed to be detachable from the main body so as to be operated manually, and the read image information is then transmitted to the facsimile apparatus at the destination through a telephone by using an acoustic coupler. Thus, an original, of a relatively large size or a bulky original such as book, can be read and its image data can be transmitted.

However, in such devices, in order to transmit the image data to another facsimile apparatus, an acoustic coupler is needed. This is extremely inconvenient.

In another conventional facsimile apparatus, with the image reading unit mounted on the main body, when reading the original image is conveyed by conveying the original manually, since the image reading unit is designed only to be mounted on the upper part of the main body, the image reading unit may be lifted up depending on the thickness of the original. Thus, the image reading unit may be loosened by the moving action of the original in the conveying direction.

Besides, in such a facsimile apparatus, in order to sequentially read a plurality of originals and transmit the original images, an original stacker for stacking the plurality of originals to be conveyed is installed near the original inlet formed in relation to the image reading unit or the main body of the facsimile apparatus. The plurality of originals set in the original stacker are conveyed to the vicinity of the image reading unit through the original inlet, one by one sequentially.

In such facsimile apparatus, however, since the space for installing the original stacker is needed, and the original stacker and the parts for installing it are necessary. Thus, the number of parts increase, and the size of the facsimile apparatus becomes large and the costs are higher.

Still further, in such a facsimile apparatus, in order to operate the image reading unit manually, the position detecting roller for recognizing the reading position by the reading unit is disposed beneath the reading unit. This position detecting roller is not needed when the reading unit is mounted on the main body. However, from the view point of the role of the position detecting roller in manual operation of the image reading unit this position detecting roller is located near the original conveying route. Therefore a force, acting in the opposite direction of the original conveying direction, acts on the original. This is caused by the position detecting roller and the surface opposite to the position detecting roller of the apparatus main body.

In order to reduce such a force, in a typical device, a follower roller is disposed at the position of the main body opposite to the position detecting roller. In such a method, however, the number of parts increases in order to install the follower roller, and thus the cost increases. Further, the space for installing the follower roller is necessary. This results in an increase in the size of the main body.

On the other hand, as the information-oriented society is advancing today, the use of copying machine and facsimile apparatus in the general household is expected. The telephone set with facsimile function had been hitherto proposed, but it was for business use, and was large and expensive. It was not suited for home use. In general houses, the facsimile function may not be always necessary. For example, in the telephone set with facsimile function, simultaneously possesses a copying function. However, in a general household, only the copying function and telephone function were used. Thus, the circuits for realizing the facsimile function were not used at all. This was extremely wasteful.

SUMMARY OF THE INVENTION

It is hence a primary object of the present invention to present an image data transmission apparatus capable of transmitting the image data read by manual operation of the image reading unit, in a simple structure, by solving the above-discussed technical problems.

In order to achieve the above object the image data transmission apparatus of the present invention in a preferred embodiment includes:

an image reading unit for reading the original image, and a transmission apparatus main body. The main body contains a memory for storing the image data read by the image reading unit and transmits the content of the memory.

The image reading unit is detachably mounted on the transmission apparatus main body.

. Further, the transmission apparatus main body is provided with a conveying device for conveying an original. This occurs when the image reading unit is mounted on the transmission apparatus main body.

Thus, original is being conveyed and read in a state in which the image reading unit is mounted on the transmission apparatus main body.

Further, the image reading unit is capable of scanning an original to read the original image, in a state in which the image reading unit is dismounted from the transmission apparatus main body.

According to the invention, the image reading unit is detachably mounted on the transmission apparatus main body in order to transmit the read image data. While the image reading unit is mounted on the transmission main body, by setting an original on the transmission apparatus main body, the original is conveyed by the conveying device, and the original image is read by the image reading unit. When the image reading unit is dismounted from the transmission main body, the original can be read by scanning the image reading unit manually over the original.

In another preferred embodiment of the invention, the image reading unit includes:

a rotary roller which is rotated in contact with the surface of an original, of which the image data is to be read.

Further, an angular dislocation detecting device is included for sending out a signal at every predetermined angular dislocation of the rotary roller. It further detects the relative moving state of the image reading unit and the original.

The transmission apparatus main body includes a transmission device for storing the output of the image reading unit in a memory in synchronism with the output of the angular dislocation detecting device. It then transmits the content of the memory. Therefore, since the relative state of the image reading unit and the original is detected, and the output of the image reading unit is stored in the memory in synchronism therewith, accurate image reading is realized.

In a further preferred embodiment of the invention, the transmission apparatus main body includes:

a sheet member which is made of a material that contains a low coefficient of friction as opposed to the original. It is placed opposite to the rotary roller when the image reading unit is mounted. In such image data transmission apparatus, when the image reading unit is mounted on the transmission apparatus main body, the original is conveyed between the rotary roller and the sheet member. During this process, since the sheet member is made of a material which contains a low coefficient of friction as opposed to the original, the frictional force acting in the direction opposite to the original conveying direction is reduced. Therefore, the original can be conveyed accurately, and correct reading is realized. Further, since this sheet member is disposed, for example by being adhered, with a position opposite to the rotary roller in the mounted state of the image reading unit, the structure is not. Thus, a reduction of frictional force is realized without occupying a large space.

It is another object of the present invention to present an image data transmission apparatus which is capable of selectively adding a function for transmitting image data through a telephone circuit. To achieve this object, the transmission apparatus main body of the image data transmission apparatus of the invention includes:

a handset containing a speaker and a microphone for telephone communications. It further includes, a telephone circuit connected to a telephone line for sending out the voice signal from the microphone of the handset onto the telephone line and acoustically converting the voice signal from the telephone line through. Further, a memory is included for storing the image data read by the image reading unit, as is a printer for printing the content of this memory on a recording paper for copying and printing the image data transmitted through the telephone line.

A facsimile processing device is mounted on the transmission main body for sending out the content of the memory through the telephone line and storing the image data received through the telephone line in the memory.

The facsimile processing device, for realizing the function for transmitting the image data through the telephone line in this way, is detachably connected to the transmission apparatus main body. Therefore, by selectively adding the facsimile processing device, the function for transmitting the image data may be selectively added.

In another preferred embodiment of the present invention, the image data transmission apparatus includes an image reading unit, disposed along the original conveying route, which is detachably mounted on the transmission apparatus main body. The read image data is then transmitted. It is characterized in that the image reading unit is provided with a notch at an end of the upstream side of the original conveying direction of the image reading unit, and a guide receptacle at an end of the downstream side of the original conveying direction.

Further, the transmission apparatus main body is provided with a latch to be engaged with the notch, and a positioning guide to be engaged with the guide receptacle.

In such image data transmission apparatus, with the image reading unit mounted on the transmission apparatus main body, the image data can be read accurately. That is, when the original is inserted, the guide receptacle of the image reading unit is positioned on the positioning guide, so that the moving action in the original conveying direction is inhibited. Besides, since the notch is engaged with the latch, lifting of the image reading unit against a force, acting in the thicknesswise direction of the original, may be prevented.

It is a further object of the present invention to present an image data transmission apparatus capable of storing a plurality of originals. This occurs when the image reading unit is mounted on the transmission apparatus main body. Further, it occurs without resorting to a particular device for disposing the original near the original inlet. To achieve this object, the transmission apparatus main body of the image data transmission apparatus of the invention:

includes a base body, and an operating panel. The operating panel has an operating surface, having one end disposed near the original inlet of the base body, which is free to dislocate angularly about the axial line crossing the original inserting direction on the base body.

Such an operating panel is stably positioned in the original guide position, wherein the operating surface is inclined downward toward the original inlet.

It is further in an operating position wherein the operating surface faces the front side.

Therefore, when positioned in the original guide position, the operating panel can be utilized as an original stacker for stacking a plurality of originals. That is, the stacked originals are appropriately led into the original inlet formed in the transmission apparatus main body, and are conveyed one by one.

When positioned in the operating position, it is appropriate for manipulating the operation buttons provided on the operating surface. Therefore, since the operating panel also functions as an original stacker, no particular structure for leading the original into the original inlet is needed.

BRIEF DESCRIPTION OF THE DRAWINGS

These and other objects of the invention, as well as the features and advantages thereof, will be better understood and appreciated from the following detailed description taken in conjunction with the drawings, in which:

FIG. 4 is a sectional view showing an engaging structure of the apparatus main body 2 and the reading unit 4;

DETAILED DESCRIPTION OF THE PREFERRED EMBODIMENTS

Figure 1:
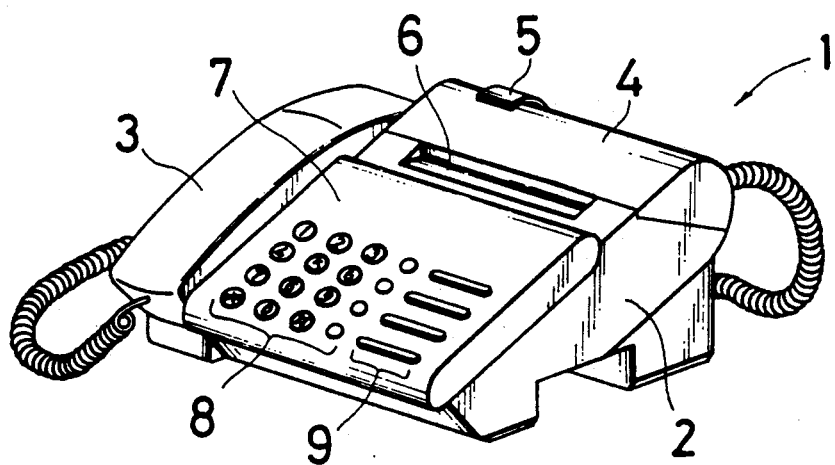
FIG. 1 is a perspective view showing the outline of a telephone set 1 as an embodiment of the invention.

Referring now to the drawings, preferred embodiments of the invention are described in details below.

EXAMPLE

FIG. 1 is a perspective view showing the outline of a telephone set 1 which is an image data transmission apparatus in an embodiment of the invention. The telephone set 1 is composed to possess also a facsimile function, and comprises an apparatus main body 2 and a handset 3, among others. The apparatus main body 2 is detachably equipped with a reading unit 4 for reading the original, and a start switch 5 for indicating the start of an original being disposed in the upper part thereof. While the reading unit 4 is mounted on the apparatus main body 2, an inlet 6 for inserting the original is formed relatively to the reading unit 4.

The apparatus main body 2 is further provided with an operation panel 7, being free to dislocate angularly near the inlet 6, around the axial line crossing with the original inserting direction at one end. The axial line is one roughly parallel to the longitudinal direction of the inlet 6. This operation panel 7 comprises a numeric key group 8 for selecting a telephone number, and a function key group 9 for selecting functions.

Figure 2:
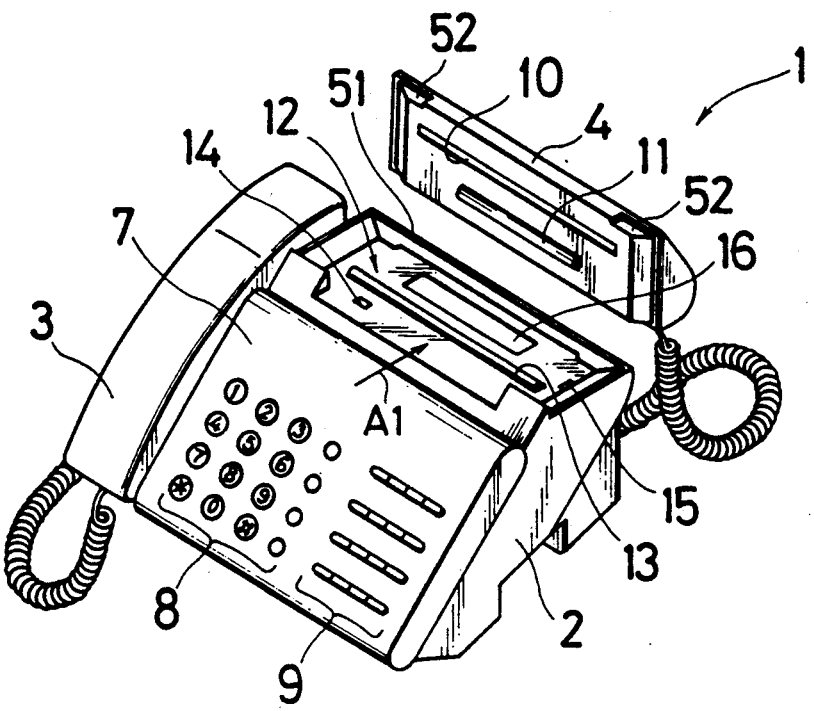
FIG. 2 is a perspective view showing the state of dismounting a reading unit 4 of the telephone set 1 from an apparatus main body 2.

FIG. 2 is a perspective view showing the dismounted state of the reading unit 4 from the apparatus main body 2. The reading unit 4 is provided with a one-dimensional contact type image sensor (hereinafter called image sensor) 10, and a rotary roller 11 which is coupled to a rotary encoder described later. At both ends of the front part of the reading unit 4, notches 52 are formed as stated below.

At a mounting part 12 where the reading unit 4 of the apparatus main body 2 is installed, there is a conveying roller 13 for conveying the originals. At the operation panel 7 side of the conveying roller 13, that is, at the upstream side in the original conveying direction (the direction of arrow A1 in FIG. 2), there is an original sensor 14 for detecting the insertion of an original. Further, a detecting sensor 15 for detecting the mounting or dismounting of the reading unit 4, on or off the apparatus main body 2, is disposed near one end of the mounting part 12. At the downstream side end of the original conveying direction of the mounting part 12, a positioning guide 51 is disposed, as will be described later.

Figure 3:
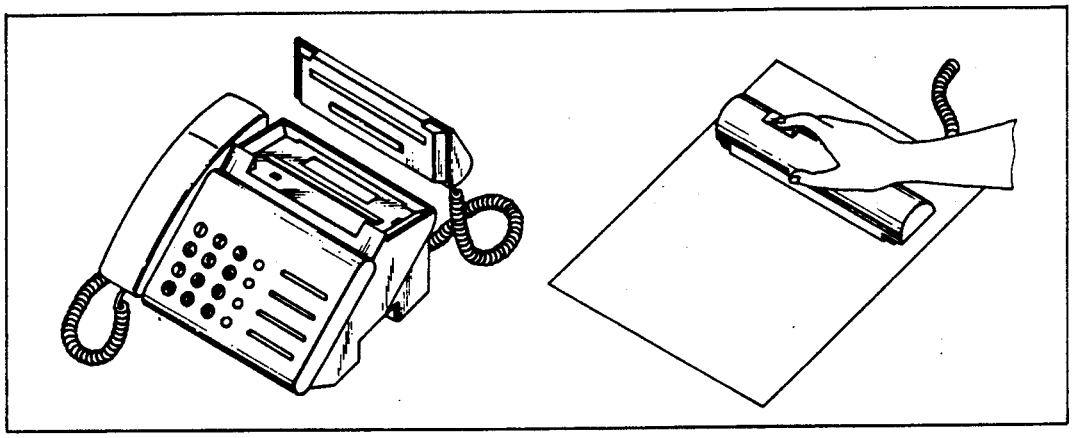
FIG. 3 is a plan view of a friction reducing sheet 16.

At the bottom of the mounting part 12, when the reading unit 4 is mounted on the mounting part 12, at the position opposite to the rotary roller 11, there is disposed a friction reducing sheet 16 in a sheet form. The sheet is made of a material which is of a low coefficient of friction as compared to the original. On the surface of this friction reducing sheet 16, for example, an illustration to show the handling manner of the reading unit 4 is printed, as shown in FIG. 3.

FIG. 4 is a sectional view showing the details of the engaging structure of the reading unit 4 and the apparatus main body 2. FIG. 4 (1) shows a mounted state, and FIG. 4 (2) shows a dismounted state.

In the apparatus main body 2, a latch 50 made of leaf spring or similar device, is disposed at both ends of the upstream side in the original conveying direction of the mounting part 12. Positioning guides 51 are disposed along the downstream side ends.

On the other hand, the reading unit 4 is provided with notches 52 to be engaged with the latches 50, and guide receptacles 53 to be engaged with the positioning guide 51.

As shown in FIG. 4 (2), by lifting the reading unit 4 in the direction of arrow 54 about the positioning guides 51, the notches 52 are disengaged from the latches 50, so that the reading unit 4 may be detached In FIG. 4 (1), meanwhile, when the original is inserted from the arrow 55 direction, since the guide receptacles 53 of the reading unit 4 are positioned in the positioning guides 51, the moving action in the original conveying direction may be suppressed. Since the notches 52 are engaged with the latches 50, lifting of the reading unit 4 against the force in the thicknesswise direction of the original may be prevented.

Figure 5:
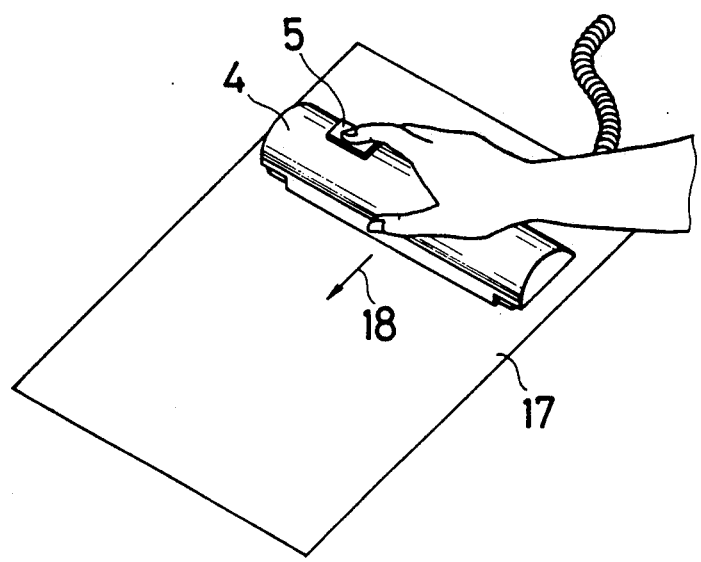
FIG. 5 is a perspective view showing the state of use with the reading unit 4 dismounted from the apparatus main body 2.

FIG. 5 is a perspective view showing the state of use with the reading unit 4 dismounted from the apparatus main body 2. When reading a large original or a book which cannot be inserted into the inlet 6, the reading unit 4 is dismounted from the apparatus main body 2. In this case, the operator puts the reading unit 4 on the original 17 so that the image sensor 10 of the reading unit 4 may be opposite to the surface of the original 17. He then pushes the start switch 5, and it then moves in the direction of the arrow 18 in FIG. 5. As a result, the image sensor 10 reads the original images sequentially. At this time, since the rotary roller 11 is turned in proportion to the amount of displacement of the reading unit 4, the reading position can be detected by disposing, for example, a rotary encoder relatively to this rotary roller 11.

Figure 6:
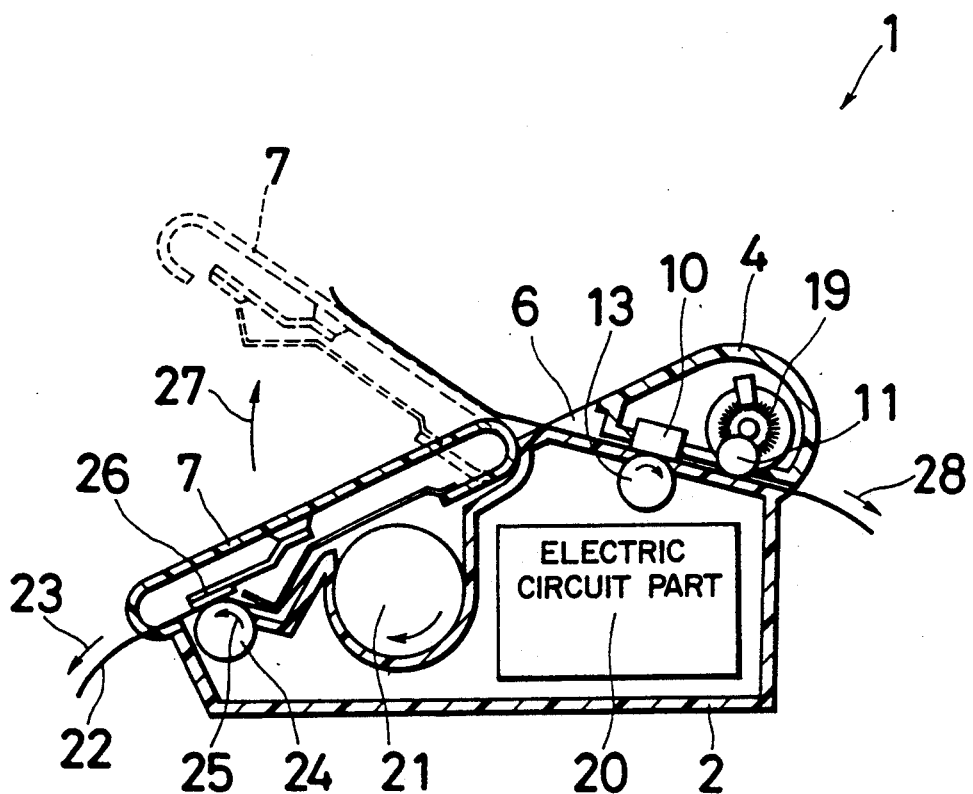
FIG. 6 is a sectional view showing a simplified structure of the telephone set 1.

FIG. 6 is a longitudinal sectional view showing a simplified structure of the telephone set 1. In relation to the rotary roller 11, a rotary encoder 19 is disposed as the device for detecting the amount of angular dislocation. Its output is applied to an electric circuit part 20 contained in the apparatus main body 2. Thus, when the reading unit 4 is dismounted from the apparatus main body 2, the information about the reading position of the image sensor 10 is fed into the electric circuit part 20.

In the apparatus main body 2 near the end at the opposite side of the inlet 6 of the operation panel 7, there is a platen 24 for conveying a thermal recording paper 22 supplied from a recording paper roll 21 in the direction of arrow 23. When recording an image, this platen 24 is angularly dislocated in the direction of arrow 25 by a pulse motor (not shown) or similar device. Relative to the platen 24, there is disposed a thermal head 26 which comprises heating resistance elements arranged in dot forms along the longitudinal direction of the platen 24.

For recording the image information onto the thermal recording paper 22, the platen 24 is angularly dislocated in the direction of arrow 25, and the thermal head 26 is heated and driven in correspondence with the image to be recorded.

In the telephone set 1, when the facsimile function is selected by the operation of the function key group 9, the operation panel 7 is angularly dislocated in the direction of arrow 27 by the operator. It is supported at the position indicated by broken line in FIG. 6 by a structure (not shown). In such a state, a plurality of originals can be put on the operation panel 7, so that the operation panel 7 can function as an original stacker for stacking the originals. The plurality of the originals put on the operation panel 7 are led, one by one, from the inlet 6 to the vicinity of the image sensor 10, and conveyed in the direction of arrow 28 at constant speed by the conveying roller 13, while the original images are being read.

Figure 7:
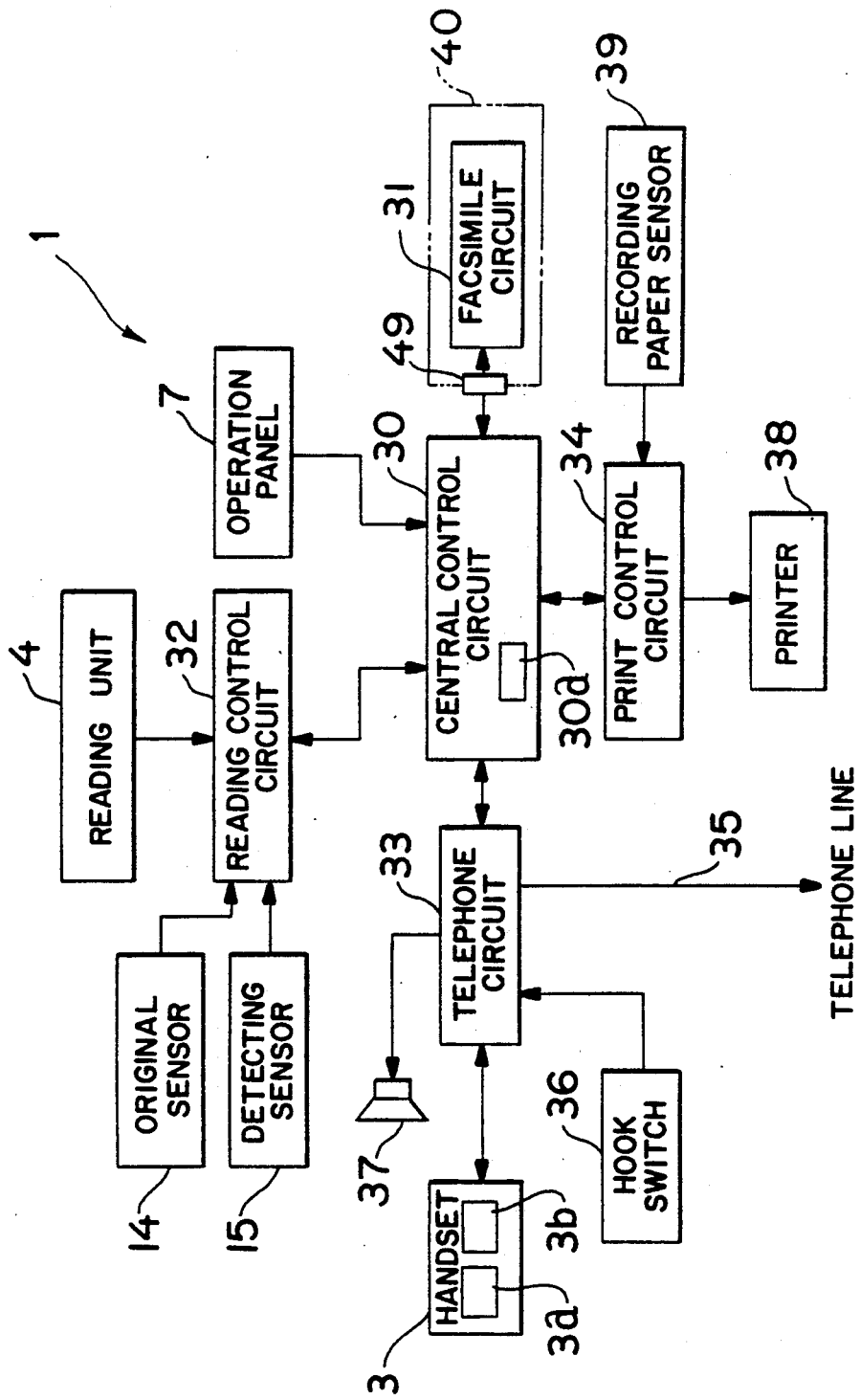
FIG. 7 is a block diagram showing an electrical composition of the telephone set 1.

FIG. 7 is a block diagram showing an electrical composition of the telephone set 1. The telephone set 1 contains a central control circuit 30 incorporating a memory 30a for realizing various functions and performing a series of controls of the functions. The central control circuit 30 is combined with a facsimile circuit 31 for realizing the facsimile function, a reading control circuit 32 for controlling the operation of the reading unit 4, a telephone circuit 33 for realizing the telephone function, and a print control circuit 34 for controlling the rotation of the platen 24 and heating of the thermal head 26. To this central control circuit 30, signals corresponding to the operations of the numeric key group 8 and function key group 9 on the operation panel 7 are supplied. The facsimile circuit 31 is contained in a facsimile cartridge 40 as explained below, and is connected with the central control circuit 30 by use of a connector 49.

To the reading control circuit 32, signals are supplied from the reading unit 4, that is, from the image sensor 10 and rotary encoder 19. To the reading control circuit 32, furthermore, signals from the original sensor 14 and detecting sensor 15 are also supplied.

The telephone circuit 33 is connected to the telephone line through line 35. The handset 3, containing the speaker 3a and microphone 3b, is connected to the telephone circuit 33. Further, the output from a hook switch 36 disposed in relation to the handset 3 is supplied thereto. The telephone circuit 33 is also combined with a speaker 37 for acoustically converting various signal sounds and ringing tones for calling.

The print control circuit 34 is connected with a pulse motor for rotating the platen 24 and a printer unit 38 including a circuit for heating the thermal head 26. It is also connected with a recording paper sensor 39 for detecting the end of thermal recording paper 22.

In response to the operation of the numeric key group 8 and function key group 9 on the operation panel 7, the central control circuit 30 controls, by selective activation, the facsimile circuit 31, reading control circuit 32, telephone circuit 33, and print control circuit 34.

Figure 8:
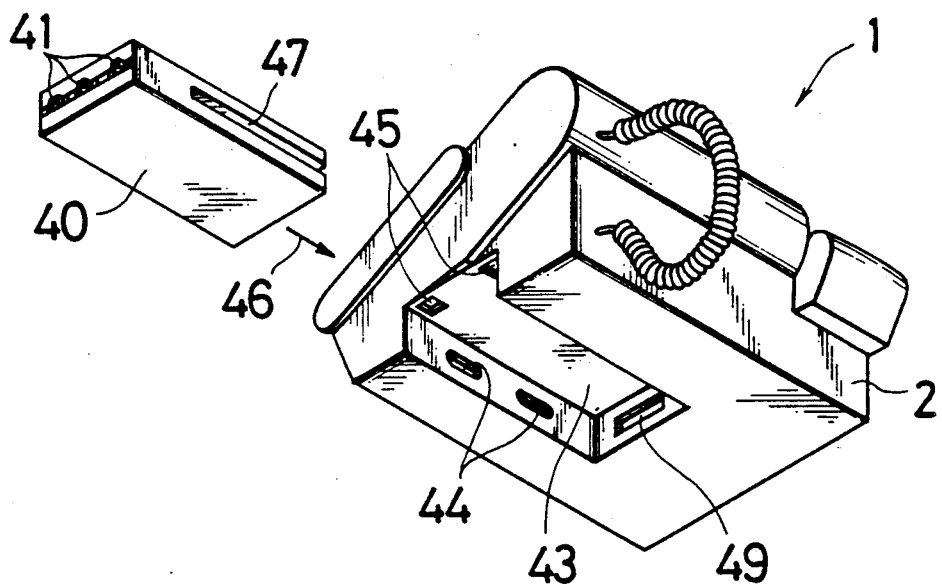
FIG. 8 is a perspective view showing a simplified mounting structure of a facsimile cartridge 40 on the apparatus main body 2.
Figure 8:
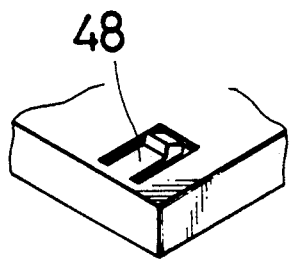

FIG. 8 is a perspective view for explaining the mounting structure of the facsimile cartridge 40 mentioned later on the apparatus main body 2. In this embodiment, the facsimile circuit 31 is contained in the facsimile cartridge 40, and by composing the facsimile cartridge 40 so as to be detachable to the apparatus main body 2, the facsimile function can be selectively added to the telephone set 1. The facsimile cartridge 40 contains switches 41, such as automatic/manual reception selector and reception mode selector, so as to cause the telephone set 1 to function as facsimile apparatus. In the lower part of the apparatus main body 2, a mounting recess 43 is formed. In this mounting recess, a guide protrusion 44 and a detent dent 45 are formed. The facsimile cartridge 40 is conveyed by the operator in the direction the arrow 46 in FIG. 8 and is mounted. At this time, the guide protrusion 44 slides in a guide groove 47 formed at the side of the cartridge 40, so that the facsimile cartridge 40 is led into the mounting position In the upper part of the facsimile cartridge 40, a detent claw 48 shown in FIG. 8 (2) is formed, and this detent claw 48 is engaged in the detent dent 45. As a result, the facsimile cartridge 40 is installed in the mounting recess 43. In the mounting recess 43, a connector 49 having plural terminals is disposed, and through this connector 49, the signals are exchanged between the facsimile circuit 31 contained in the cartridge 40 and the central control circuit 30.

Below, referring to FIGS. 1 to 7, various functions of the telephone set 1 are explained.

(1) Telephone function

When using the telephone set 1 as an ordinary telephone set, the handset 3 is lifted when calling, and the telephone number is selected by operating the numeric key group 8 on the operation panel 7. When the telephone set at the destination is connected to the telephone line, mutual communication is established. When called, a ringing tone is emitted from the speaker 37, and by lifting the handset 3, talking with the caller is realized.

(2) Copy function

1. Automatic original reading mode

The operator inserts the original to be copied into the inlet 6 from its front end, and presses the start switch 5 provided in the upper part of the reading unit 4. The inserted original is conveyed at constant speed by the conveying roller 13. At this time, the image sensor 10 reads the original image sequentially in synchronism with the rotation of the conveying roller 13. The copy image of the read original image is obtained on the thermal recording paper 22 by the function of the platen 24, thermal head 26 and others.

2. Manual original reading mode

The operator removes the reading unit 4 from the apparatus main body 2, and puts it on the original surface as shown in FIG. 5. After pushing the start switch 5, the operator moves it in the direction of arrow 18 in FIG. 5. As the reading unit 4 is moved, the rotary roller 11 rotates, and the position information is detected from the rotary encoder 19. The image sensor 10 reads the images sequentially in synchronism with the position information. The copy image of the read original image is obtained on the thermal recording paper 22 by the function of the platen 24, thermal head 26 and others. The copy operation is stopped by pressing the start switch 5 again.

(3) Facsimile function

1. Transmission action by automatic original reading mode.

The operator puts the facsimile cartridge 40 into the apparatus main body 2, and inserts the end of the original into the inlet 6. Lifting the handset 3, the telephone number of the facsimile of the destination is selected by the operation of the numeric key group 8 and function key group 9 on the operation panel 7. Afterwards, when connection of the destination facsimile to the telephone line is confirmed, the start switch 5 is pressed. As a result, the original is conveyed at a constant speed by the conveying roller 13, and the image sensor 10 reads the original image in synchronism with the rotation of the conveying roller 13. The image data corresponding to the read original image is once stored in the memory 30a, and is coded as transmission signal by the facsimile circuit 31, and is transmitted to the facsimile apparatus at the destination.

2. Transmission action by manual original reading mode.

The operator puts the facsimile cartridge 40 into the apparatus main body 2. The reading unit 4 is dismounted from the apparatus main body 2, and is put on the original as shown in FIG. 5. Lifting the handset 3, the facsimile dial telephone of the destination is selected by the numeric key group 8 and function key group on the operation panel 7. When the connection of the destination facsimile to the telephone line is confirmed, the operator presses the start switch 5, and moves the reading unit 4 in the direction of arrow 18 in FIG. 5. By the movement of the reading unit 4, the detection roller 11 is dislocated angularly, and the information about the reading position of the reading unit 4 is detected from the rotary encoder 19. In synchronism with this position information, the image sensor 10 sequentially reads the image, and stores in the memory 30a. The image data corresponding to the thus read original image is coded as transmission signal by the function of the facsimile circuit 31, and is transmitted to the destination facsimile apparatus sequentially. The transmission operation is finished by pushing the start switch 5 again.

3. Reception action

The facsimile cartridge 40 is preliminarily mounted on the apparatus main body 2. By this time, by operating the automatic/manual reception selector on the facsimile cartridge 40, the automatic or manual mode of reception action is selected. In the case of automatic reception, by the function of the facsimile circuit 31, the apparatus is automatically connected to the telephone line, and the image data from the caller's facsimile apparatus is received. The image corresponding to the received image data is printed on the thermal recording paper 22 by the function of the platen 24, thermal head 26 and others.

In the case of manual reception, in response to the ringing tone acoustically released from the speaker 37, the operator lifts the handset 3 to connect the line, and then pushes the start switch. When the start switch 5 is pressed, the image data from the caller's facsimile apparatus is received, and the received image is printed out on the thermal recording paper 22 by the function of the thermal head 26 and others.

In this embodiment, as explained herein, the reading unit 4 installed in the telephone set 1 having facsimile function is detachably mounted on the apparatus main body 2. Therefore, a large original or a bulky original, such as a book, that cannot be inserted from the inlet 6 can be read. Thus, the read image information can be transmitted without requiring particular structure.

A friction reducing sheet 16 is disposed in the position opposite to the rotary roller 11 at the bottom of the mounting part 12 in which the reading unit 4 is installed. The rotary roller 11 is intended to detect the reading position when reading the original image manually by detaching the reading unit 4 from the apparatus main body 2. Therefore, in the state of the reading unit 4 being mounted on the apparatus main body 2, the force acting in the opposite direction to the original conveying direction must be as small as possible when the original passes between the rotary roller 11 and the mounting part 12. For this purpose, in this embodiment, the friction reducing sheet 16 is disposed as mentioned above.

Furthermore, in the telephone set 1 of this embodiment, the facsimile cartridge 40, which is a processing device incorporating the facsimile circuit 31 for realizing the facsimile function, is detachably composed in the apparatus main body 2. By installing the facsimile cartridge 40 in the apparatus main body 2, the telephone set 1 possesses the facsimile function. When the facsimile cartridge 40 is not installed in the apparatus main body 2, the telephone set 1 has the telephone function and copy function.

For example, when the telephone set 1 is used at home, the copy function may be necessary, but the facsimile function is not usually necessary. In such a case, it is not required to install the facsimile cartridge 40 in the apparatus main body 2. Thus, it is possible to present a telephone set possessing only desired functions.

Furthermore, in the telephone set 1, the operation panel 7 is installed near the inlet 6 in a manner being free to dislocate angularly around the axial line crossing with the original conveying direction. This operation panel 7 is installed, having stable positions at both ends in the angular dislocation direction. Therefore, when the facsimile function is selected on the telephone set 1, by supporting the operation panel 7 at the position indicated by broken line in FIG. 6, the operation panel 7 may be used as the original stacker for stacking a plurality or originals. In other words, a particular structure is not needed for stacking a plurality of originals, which is advantageous for downsizing of the telephone set 1.

Still further, when the original is inserted with the reading unit 4 being mounted on the apparatus main body 2, since the guide receptacles 53 of the reading unit 4 are positioned at the positioning guides 51, the moving action in the original conveying direction may be suppressed. Since the notches 52 are engaged with the latches 50, lifting of the reading unit 4 against the force in the thicknesswise direction of the original may be prevented. Thus, accurate image reading may be always realized in the automatic original reading mode.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image data transmission apparatus comprising:
   image reading means for reading an original image, and
   a transmission apparatus main body, including a memory means for storing the image data read by the image reading means and transmitting the data of the memory means;
   said image reading means being detachably mounted on the transmission apparatus main body;
   said transmission apparatus main body further including conveying means for conveying the original image, when the image reading means is mounted on the transmission apparatus main body, to be read by the image reading means;

said image reading means being moved relative to said original, to read the original image, when the image reading means is dismounted from the transmission apparatus main body, said image reading unit further including, rotary roller means for rotating in contact with the surface of the original from which the image is to be read, and angular dislocation detecting means for sending out a signal at every predetermined angular dislocation of the rotary roller, and for detecting the relative moving state of the image reading means and the original; and said transmission apparatus main body further including, transmission means for storing the image data read by the image reading means in the memory means in synchronism with the output of the angular dislocation detecting means, and transmitting the content of the memory means, and a sheet member made of a material which has a low coefficient of friction as compared to the original, which is disposed opposite to the rotary roller means while the image reading unit is mounted on the transmission apparatus main body.

2. An image data transmission apparatus, as claimed in claim 1, wherein the transmission apparatus main body further comprises:

an operating panel, having an operating surface, having one end disposed near an original inlet of the base body through which originals to be read are converted, and being free to dislocate angularly about an axial line crossing with a direction for inserting direction on originals into the base body, wherein the operating panel is stably positioned in an original guide position and the operating surface is inclined downward toward the original inlet so as to allow for stacking of a plurality of originals to be read.

3. An image data transmission apparatus including an image reading unit for reading image data from an original, disposed at the end of a conveying path along which an original to be read is conveyed, the reading unit being detachably mounted on the transmission apparatus main body, the apparatus for transmitting the read image data, comprising:

a notch on the image reading unit, at an end of the image reading unit closest to the original conveying path;

a guide receptable on the image reading unit, at an end of the image reading unit furthest from the original conveying path;

a latch on the transmission apparatus main body, to be engaged with the notch; and a positioning means, on the transmission apparatus main body, for engaging with the guide receptacle.

4. An image data transmission apparatus for transmitting image data, read from an original by a reading unit, the reading unit being detachably connected to the transmission apparatus main body to enable it to read image data in a detached state or in an attached state, the apparatus comprising:

rotary roller means, in said image reading unit, for rotating in contact with an original from which data is to be read by said reading unit when it is in a detached state;

conveying means, in said transmission apparatus main body, for conveying an original, to be read, past said reading unit when it is in an attached state; and low friction sheet means, containing a coefficient of friction less than that of said original and placed opposite said rotary roller means, for reducing friction caused by said rotary roller means when said original is conveyed by said conveying means.

5. An image data transmission apparatus for transmitting image data, read from an original by a reading unit, the reading unit being detachably connected to the transmission apparatus main body to enable it to read image data in an attached state when an original is conveyed through an inlet past the reading unit, or in a detached state, the apparatus comprising:

detachability means for engaging and disengaging the reading unit with the transmission apparatus main body so as to create the detachability of the reading unit, the engaging means including, a notch located on a side of the reading unit closest to said inlet, a guide receptable, located on a side of the reading unit furthest from said inlet, latching means, located on the transmission apparatus main body, for engaging with the notch when the reading unit is in an attached state and for disengaging with the notch when the reading unit is in a detached state, position guiding means, located on the transmission apparatus main body, for engaging with the guide receptable when the reading unit is in an attached state and for disengaging with the notch when the reading unit is in a detached state.

* * * * *

UNITED STATES PATENT AND TRADEMARK OFFICE
CERTIFICATE OF CORRECTION

PATENT NO.   :  4,989,237

DATED        :  January 29, 1991

INVENTOR(S)  :  Matahira KOTANI et al.

It is certified that error appears in the above-identified patent and that said Letters Patent is hereby corrected as shown below:

On the title page, Item (73), please change the Assignee from "Sharp Kabushiki Kaisha" to --Sharp Kabushiki Kaisha and Nippon Telegraph and Telephone Corporation--

Signed and Sealed this

Twenty-fourth Day of May, 1994

Attest:

BRUCE LEHMAN

*Attesting Officer*   Commissioner of Patents and Trademarks